A. HURD.
WORK-HOLDING DEVICE FOR DRILLING-MACHINES.
No. 190,042. Patented April 24, 1877.
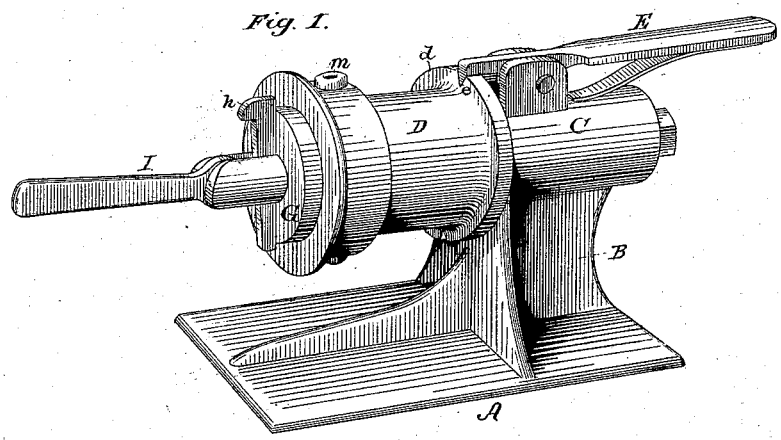
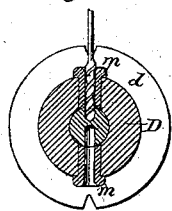
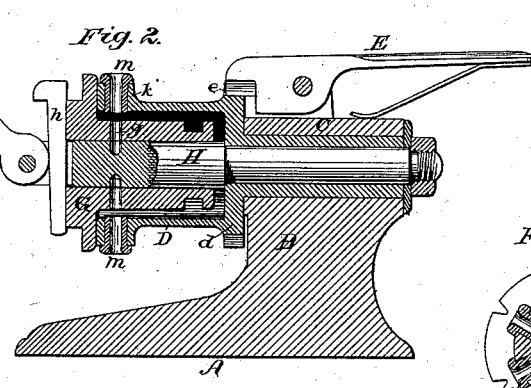
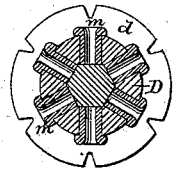
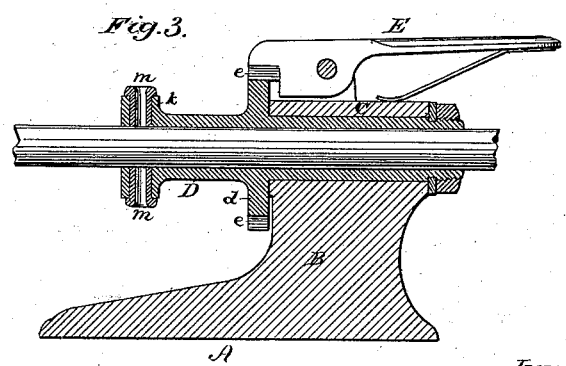
Witnesses:
C. Clarence Poole
Aug. Jordan
Inventor:
Asa Hurd
By his atty R. D. O. Smith

UNITED STATES PATENT OFFICE.

ASA HURD, OF YONKERS, NEW YORK.

IMPROVEMENT IN WORK-HOLDING DEVICES FOR DRILLING-MACHINES.

Specification forming part of Letters Patent No. 190,042, dated April 24, 1877; application filed February 21, 1877.

*To all whom it may concern:*

Be it known that I, ASA HURD, of Yonkers, in the county of Westchester and State of New York, have invented a new and useful Improvement in Drill Gigs and Guides, of which the following is a full and clear description:

It has become the common practice in large manufacturing establishments to produce the various parts of the machines or articles manufactured in perfect duplicate, so that in assembling there will be no fitting of parts required; but one class of work has not heretofore been reduced to the required accuracy, because the trade has not possessed any tool adapted to the end required. I refer to that large class of joints composed of two parts, one of which is slipped over or resting on another, and secured by a pin which passes through both. It is apparent that to make such parts interchangeable it is necessary to obtain entire accuracy in the location and direction of the hole to be drilled; and one of the objects of my invention is to produce a gig, which constitutes the blank-holder and drill-guide, whereby a member may be securely held and always in the exact position desired, and the drill guided in the direction exactly as required. To secure the greatest attainable accuracy it is necessary to bore the required hole from one side half-way through, and the remaining distance from the opposite side, so that the boring-tool starts truly from each side, and any deviation from truth will then occur in the center of the member, where, first, it is reduced to one-half the deviation for the whole diameter, and, second, where it will do the least possible harm. It is, therefore, necessary that my drill-gig should be reversible and adjustable, and possess an index or guide to determine the accuracy of its reversal. The possession of an angular index includes, also, the possibility of adjustment to bore truly radial holes at any angular inclination to a given line, or to each other.

My invention therefore consists, first, of a rotary adjustable drill-gig, which constitutes the blank-holder and drill-guide; second, in an index or angular guide to determine the exact angular position desired; third, in removable guide-bushings, which may be adapted to the various sizes of boring-tools employed.

It is, of course, necessary that the holder shall be adapted to the particular member which it is designed to receive—that is to say, this apparatus, though it may be employed to advantage in miscellaneous work, is more especially adapted to standard operations for the various parts of which separate holders will be fitted. I therefore do not design to limit myself to the particular form of my apparatus shown, but only to such as will substantially accomplish the results above set forth.

That others may fully understand my invention, I will particularly describe that form of it which is shown in my drawings annexed, from which any skilled mechanic can construct the invention and adapt it to any particular work.

A is a bed-plate, planed true on its under side, and fitted to stand upon the table of any upright drill-press. Upon this bed there is a standard, B, which supports upon its top a box, C, the interior surface of which is cylindrical, and the axis thereof parallel with the plane of the under side of the base A. The gig D, which constitutes the blank-holder and drill-guide, has its bearing in the box C, so that it may be rotated about the axis of the same, and it is provided with a rim or index, $d$, whereby the angular extent of its rotary movement may be accurately determined. In practice, as this gig D is fitted to receive and hold blanks of definite form and dimensions, and designed to be bored in certain parts and directions, it will only be required to mark on the index $d$ the particular points at which the gig D is designed to come to rest, and this may be conveniently done by means of notches $e$, into which a spring-latch, E, may engage to hold said gig securely in position. Any other convenient or suitable method of stopping and holding the said gig may be substituted for the latch E, however, if desired.

The gig D (shown in Figures 1 and 2) is fitted for the reception of the wheel-hubs G for harvesters, through which it is desired to drill holes $g$ for the key-pin, whereby said hubs are fastened to their shafts. A central stud or shaft, H, is, therefore, rigidly secured in the axis of the case to receive the hub G, which has previously been accurately bored. The stud H is in diameter exactly equal to the shaft upon which said hub is to be finally placed. The interior surface of the gig D is, therefore, somewhat larger than the diameter of the hub G, to allow for any inequalities on the outer surface thereof.

When said hub is in place upon the stud H a key, $h$, is passed through a slot in the end of said stud to jam said hub home and clamp it. To avoid the use of blows to accomplish the result, I prefer to produce the requisite pressure by means of a small cam, I, placed in front of the key $h$, and pivoted to the stud H.

Truly radial drill-holes $k\ k$ are made at the required points through the gig D, and these I prefer to fit with removable bushings $m$, to fit drills of different sizes, and act as true guides to the same. These are refinements not essential, but convenient and advisable.

Absolute truth of operation is not attainable; but it is possible to work within a margin of error practically inappreciable, and hence, for reasons hereinbefore stated, it is required that the boring shall not proceed from one side beyond center. The work must then be reversed and the boring recommenced on the opposite side.

With the apparatus shown and herein described this operation is accomplished with ease and accuracy, and requires neither measurement, markings, or calculations.

In Figs. 3 and 4 is shown a modification to fit my apparatus to shafts for the necessary perforations to correspond with the hub perforations $g$, and in Figs. 5 and 6 are shown the method of operation upon other forms than circular.

From the above description a skillful mechanic will without difficulty be enabled to adapt my invention to any species of work, whether of regular or irregular form.

Having described my invention, what I claim as new is—

1. A rotary drill-gig, substantially for the purpose described.

2. A rotary drill-gig, substantially as described, combined with an angular index and stop-latch to determine the proper angular movement of said gig.

3. A rotary drill-gig, D, combined with a clamping device to hold the blank rigidly, as set forth.

4. A rotary drill-gig, D, provided with peripheral notches $e$, and holding-latch E, combined with the clamp-rod H and cam I, as set forth.

5. A rotary drill-gig, D, with drill-guide holes $k$ and removable thimbles $m$, adapted to various sizes of drills, as described.

ASA HURD. [L. S.]

Witnesses:
STEPHEN G. WHITE,
DAVID SCOTLAND.